United States Patent [19]

Di Vita

[11] 4,128,302
[45] Dec. 5, 1978

[54] RAY-PATH EQUALIZER FOR SIGNAL TRANSMISSION VIA MULTIMODE OPTICAL WAVEGUIDES

[75] Inventor: Pietro Di Vita, Turin, Italy

[73] Assignee: CSELT-Centro Studi e Laboratori Telecomunicazioni S.p.A., Turin, Italy

[21] Appl. No.: 779,821

[22] Filed: Mar. 21, 1977

[51] Int. Cl.² .............................................. G02B 5/14
[52] U.S. Cl. ................................................... 350/96.18
[58] Field of Search ............. 350/96 WG, 96 C, 96.18

[56] References Cited

U.S. PATENT DOCUMENTS

| 3,759,590 | 9/1973 | Arnaud | 350/96 WG |
| 3,832,030 | 8/1974 | Gloge | 350/96 WG |
| 3,980,391 | 9/1976 | Stewart | 350/96 C |

Primary Examiner—John K. Corbin
Assistant Examiner—Stewart Levy
Attorney, Agent, or Firm—Karl F. Ross

[57] ABSTRACT

Signals, especially short pulses, are transmitted by way of a series of aligned light guides with internally reflecting boundaries (i.e., fibers or foils), with interposition of two identical transparent bodies of positive refractivity between confronting guide ends. The cross-section of each refractive body in a common longitudinal plane of symmetry of the guides consists of two symmetrical truncated lens profiles whose boundary lies on a common centerline of the adjoining guides, the optical axes of the two lens profiles lying on opposite sides of that boundary.

7 Claims, 8 Drawing Figures

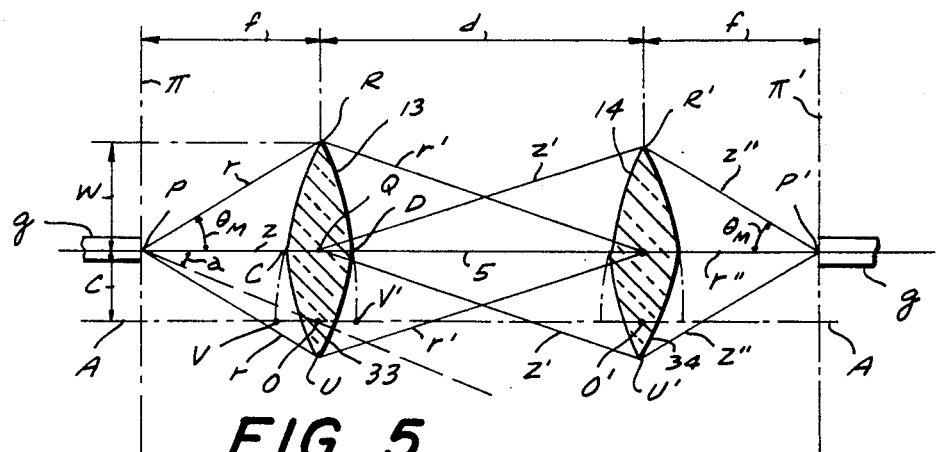
FIG. 5
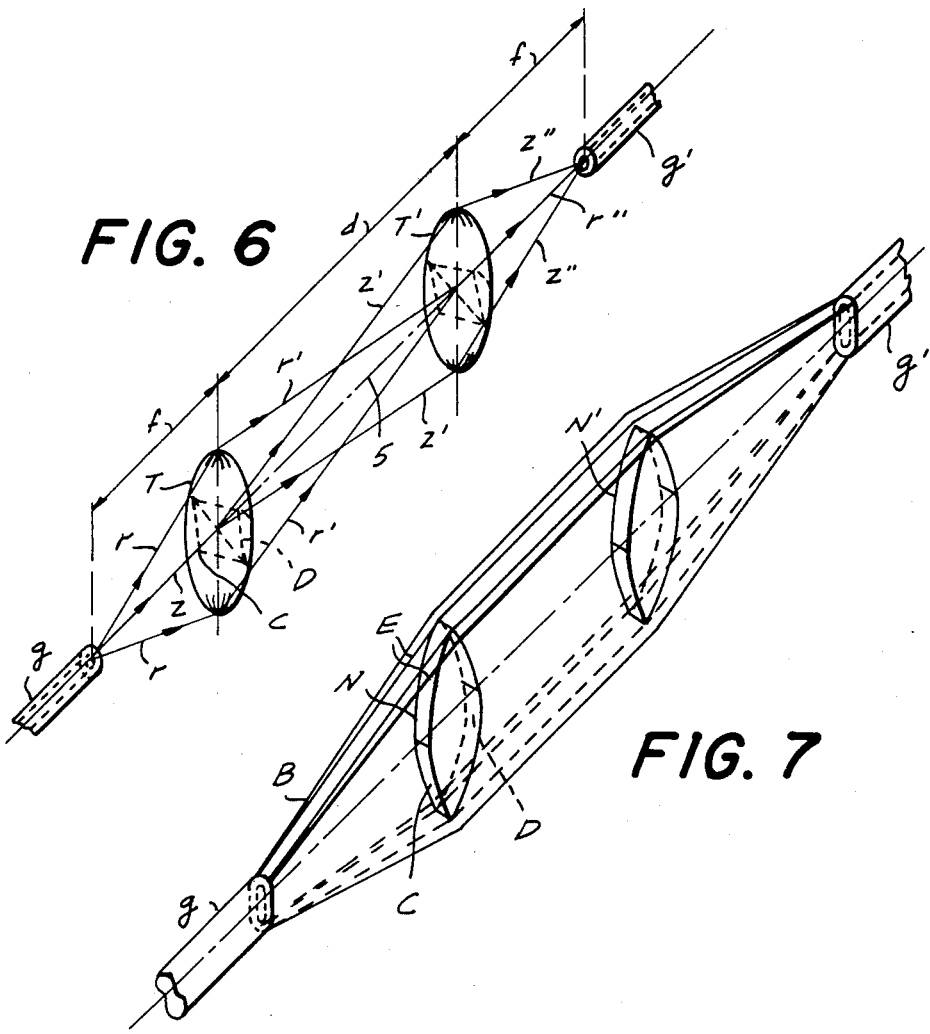
FIG. 6
FIG. 7

RAY-PATH EQUALIZER FOR SIGNAL TRANSMISSION VIA MULTIMODE OPTICAL WAVEGUIDES

FIELD OF THE INVENTION

My present invention relates to an optical equalizer for a system in which signals, especially binary ones represented by short spikes (so-called Dirac pulses), are transmitted with the aid of multimode light guides.

BACKGROUND OF THE INVENTION

A light guide as herein contemplated may be either a single optical fiber, a group of optical fibers arrayed in a flat bundle or ribbon, or a light-conducting foil. In each instance the light guide has internally reflecting boundaries with a critical angle of reflection determined by the difference between the refractive indices of the guide substance and the surrounding medium. As is well known, light rays striking the guide boundary at a glancing angle, not exceeding the critical value, are totally reflected and thus do not leave the confines of the guide. In traveling along their transmission path, they bounce back and forth between opposite guide surfaces and eventually leave the exit end of the guide at an inclination to its axis which depends upon the angle of incidence.

Theoretically, at least, a ray may pass along the axis of a straight guide without internal reflection. Such a ray has the shortest transit time through the guide in comparison with rays undergoing reflection, the longest time being that of a ray exiting from the guide surface at the critical or guidance angle. These relative delays of light rays originating at a common modulated source result at the receiving end in a broadening of the pulses and thus in a distortion of the signal. That distortion, of course, increases with the length of the transmission path.

A variety of equalizers have already been suggested for dealing with this problem. One such equalizer, described by D. C. Gloge in an article entitled "Fiber-Delay Equalization by Carrier Drift in the Detector," *Optoelectronics*, vol. 5, 1973, pages 345-350, operates electronically on the electric pulses derived from the luminous signal at the receiving end; the light rays emerging at different angles from the exit end of an optical fiber are electronically detected in separate zones working into delay lines which introduce compensatory differences in transit time. Such a system, requiring active electronic components, is relatively complex and limited to specific radiation receivers.

In a commonly owned application filed by me jointly with Riccardo Vannucci on or about Feb. 18, 1977, Ser. No. 770,232, an optical signal-transmission system has been disclosed and claimed in which the equalization of the light paths is carried out with the aid of mirrors interposed between cascaded light guides angularly adjoining one another.

Other solutions, such as those suggested in U.S. Pat. Nos. 3,759,590 and 3,832,030, provide optical equalizers with refractive cones or lenses serving for a compensatory refraction of light rays incident at different angles.

The presence of three or more refractive bodies between confronting guide ends in systems of the last-mentioned type results in a significant attenuation of the luminous radiation, especially for slanting light rays which strike the surfaces of these bodies at almost a glancing angle and are therefore subject to heavy Fresnel losses.

OBJECT OF THE INVENTION

The object of my present invention is to provide an improved equalizer for an optical signaling system requiring not more than two refractive bodies between any pair of cascaded light guides forming part of an overall transmission path, with resulting saving in the cost of the equalizer as well as increased transmission efficiency.

SUMMARY OF THE INVENTION

An improved equalizer according to my present invention comprises two identical transparent bodies of positive refractivity spaced apart along the centerline of the aligned light guides between which the equalizer is disposed, each of these bodies having a cross-section in at least one longitudinal plane of symmetry of the light guides which consists of two symmetrical truncated lens profiles having a boundary on that centerline. That boundary is offset from the optical axes of the truncated lens profiles, these axes thus lying on opposite sides of the centerline; each lens profile extends from the centerline (and therefore also from the aforementioned boundary) to at least a point of interception of a limiting ray converging at the closer light-guide end, the path of such limiting ray extending from that point of interception at a lens profile of one body to the geometrical center of the other body and thence substantially along the centerline to the more distant light-guide end.

According to a more particular feature of my invention, the distance w of the point of interception of the limiting ray from the centerline, the spacing c of the optical axes from the boundary of the lens profiles (and therefore from the centerline), the focal length f of each profile and the separation d of the geometrical centers of the two bodies are so chosen as substantially to satisfy the relationship $w/c = d/f$, for reasons that will be explained hereinafter.

Generally, the truncated lens profile will be similar to that of converging lenses with predominantly convex faces (i.e., biconvex, planoconvex or positively meniscus-shaped lenses) used in ordinary optics.

If, however, the eqalizer is embedded in a refractive medium whose index of refractivity substantially matches that of the light guides, the two equalizer bodies could also have predominantly concave faces provided that their index of refraction is less than that of the surrounding medium.

The term "light," as herein used, is not necessarily limited to radiation in the visible spectrum.

BRIEF DESCRIPTION OF THE DRAWING

The above and other features of my invention will now be described in detail with reference to the accompanying drawing in which:

FIG. 5 is a diagrammatic view similar to FIG. 1, representing another embodiment;

FIG. 6 is a perspective view similar to that of FIG. 3 but relating to the embodiment of FIG. 5;

FIG. 7 is a perspective view similar to that of FIG. 4, also relating to the embodiment of FIG. 5.

SPECIFIC DESCRIPTION

Figure 1:
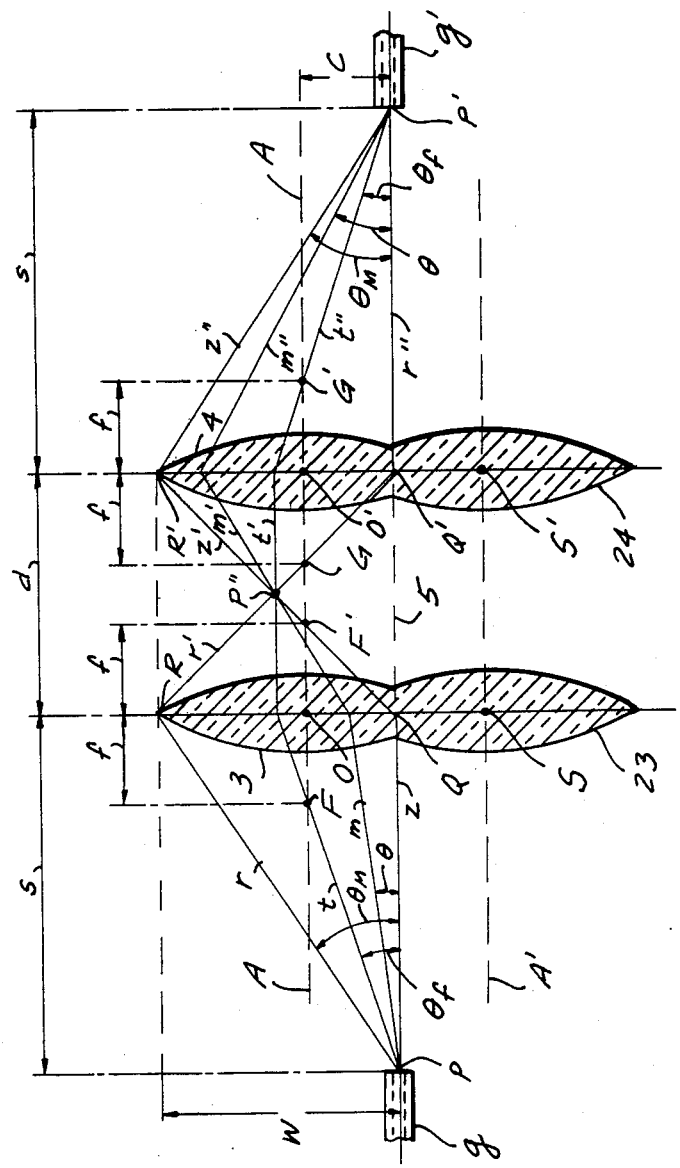
FIG. 1 is a somewhat diagrammatic view of an equalizer according to my invention inserted between confronting ends of two cascaded light guides.

In FIG. 1 I have shown an end of an incoming light guide g and a confronting end of an outgoing light guide g' centered on a common axis 5. It is assumed that these light guides are linear and of substantially the same length so that, if the two guides were closely juxtaposed, a ray passing axially through guide g from a nonillustrated light source would continue axially through light guide g' to its destination whereas a ray propagated within guide g with internal reflections at a critical angle $\theta_M$ would continue in the same manner within guide g'. Thus, the first-mentioned ray would travel from the source to the load in a shorter time than the last-mentioned ray, with resulting distortion of a signal pulse.

An equalizer according to my invention, designed to make the travel times of these two rays (as well as intermediate ones striking the guide walls at lesser angles) substantially the same, comprises two transparent bodies of positive refractivity spaced apart along a centerline 5, these bodies being of identical construction with axial cross-sections consisting of respective pairs of truncated lens profiles 3, 23 and 4, 24 meeting in a common boundary along line 5. Each lens profile, here shown to be biconvex, encompasses more than half the cross-section of a converging spherical or cylindrical lens with an optical axis A or A' spaced from centerline 5 by a distance c. Axis A passes through the optical centers O and O' of lens profiles 3 and 4, axis A' similarly passing through the optical centers S and S' of lens profiles 23 and 24. Since the four lens profiles are identical, it will be sufficient to limit the following description to the upper half of the system including profiles 3 and 4.

Each lens profile 3 and 4 has a focal length f representing the distance of its center O or O' from a pair of focal points F, F' or G, G'. The minimum height w of the profile, measured from line 5, is determined by the angle $\theta_M$ included between a limiting ray r, emerging from the center point P of guide g, and the guide axis represented by line 5. Point P is separated from the geometrical center Q of refractive body 3, 23 by a distance s which is the same as the distance between corresponding points Q' and P' of body 4, 24 and guide g'; points Q and Q' are separated by a distance d. All rays emitted by guide g in the plane of the drawing and originating at point P converge, after refraction by lens profile 3, in a point P" representing the image of points P and P'; after further refraction in lens profile 4, they meet again at point P' of guide g'. Thus, limiting ray r intercepted by profile 3 at its top R is redirected along a path r' to points P" and Q' whence it continues axially to point P' as shown at r". Conversely, an axial ray z passes from point P to point Q, thence along a path z' to point P" and the top R' of lens profile 4 and finally at the limiting angle $\theta_M$ to point P'. Also shown in FIG. 1 is an intermediate ray t, including a lesser angle $\theta_f$ with line 5, which passes through focal point F into lens profile 3, then axially via point P" into lens profile 4 as indicated at t', and finally via focal point G' along a path t" to point P' at its original angle $\theta_f$. Another intermediate ray m, including an angle $\theta$ with the guide axis, traverses the image point P" along a path m' and continues to point P' at an angle $\theta$.

The following relationships can be established between parameters w, s, f, c and $\theta_M$:

$$w = s \cdot \tan\theta_M \tag{1}$$

$$c = (s-f) \cdot \tan\theta_M \tag{2}$$

$$\tan\theta_f = (\tan\theta_M / 2) \tag{3}$$

whence $$w/s = 2s/(s-f) \tag{4}$$

and $$s = (w/c)f/(w/c - 2) \tag{5}$$

From FIG. 1 it further appears that $$w/c = d/f \tag{6}$$

By substituting the value of w/c from equation (6) in equation (5) we find that $$d/s = (2f/s - f) \tag{7}$$

Since all these parameters must be positive, equation (4) requires that $$w/c > 2 \tag{8}$$

and $$s > f \tag{9}$$

From inequality (8) it follows that the distance of interception points R and R' from optical centers O and O' must be greater than the distance of points O and O' from centerline 5.

Figure 2:
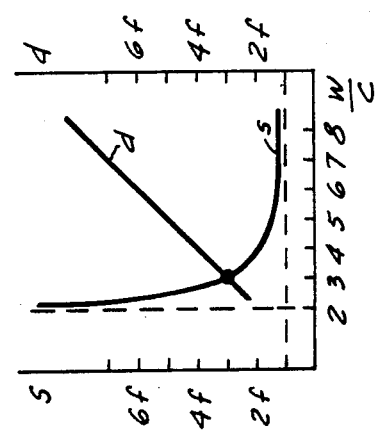
FIG. 2 is a graph relating to the construction of the equalizer of FIG. 1.

For a given focal length f, distances d becomes a linear function of ratio w/c as has been illustrated in FIG. 2. Distance s, as also shown in FIG. 2, is a hyperbolic functon of ratio w/c whose asymptotes are the co-ordinates $w/c = 2$ and $s = f$. The intersection of graphs s and d in FIG. 2 is at the point $s + 3f$ for which equation (7) gives $d = s$ while equation (6) establishes $w/c = 3$. For the ratio $w/c = 4$ we find $s = 2f$, $d = 4f$; for $w/c = 5$ we obtain $s = 5f/3$, $d = 5f$. The dimensions illustrated in FIG. 1 are $w/c = 8/3$, with $3 = 4f$ and $d = 8f/3$.

The limiting angle $\theta_M$ equals the critical angle of the guide if the system of FIG. 1 is embedded in a medium whose refractive index equals that of the guide; otherwise, that limiting angle will be somewhat larger. With guides of given numerical aperture, as determined by this limiting angle, the lens parameters can be freely selected in conformity with the aforestated relationships as long as the height of each lens profile is at least equal to the value w according to equation (1). Conversely, a given equalizer can be used with any pair of light guides whose numerical aperture satisfies that condition.

Figure 3:
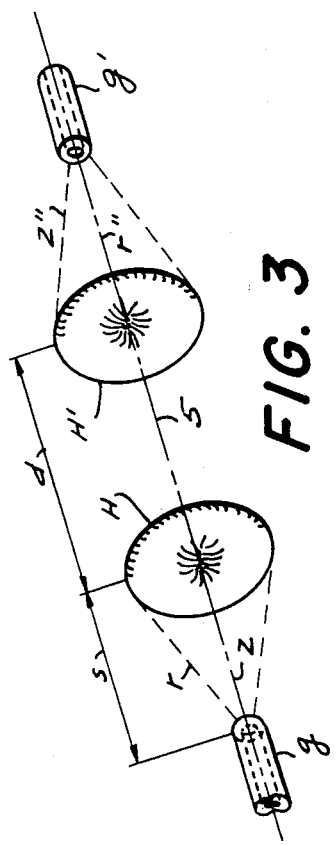
FIG. 3 is a perspective view of the system of FIG. 1 with the light guides constituted by fibers.
Figure 4:
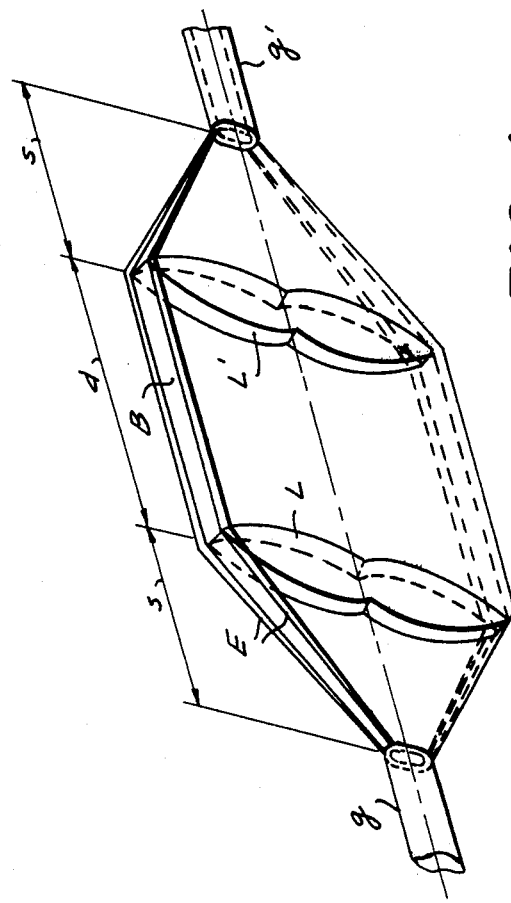
FIG. 4 is a perspective view generally similar to that of FIG. 3 but relating to a system whose light guides are in the form of foils.

In FIG. 3 I have shown two centrally symmetrical refractive bodies H and H' of toroidal shape whose cross-sections conform to the profiles of FIG. 1 and which coact with two filamentary guides g and g'. In FIG. 4, on the other hand, the guides g and g' are shown to be ribbon-shaped, with a core of generally rectangular cross-section whose minor dimension is so small as to give rise to only a single mode of propagation in a plane transverse to the plane of FIG. 1; thus, the equalizer there comprises two positively refractive bodies L and L' whose faces are cylindrically rather than spherically curved, with generatrices parallel to the minor dimension of the guide sections, so that the lens profiles are constant throughout the thickness of each body. FIG. 4 further shows a transparent member B which envelops the bodies L and L' and extends to the confronting ends of guides g and g' with flanks inclined to the guide axis at an angle at least equal to the critical angle of the guide core whose refractive index matches that of member B; the lateral surfaces of guides g and g', member B and bodies L and L' are coated with continuous reflecting layers E of different refractive index forming extensions of the guide sheaths.

Figure 8:
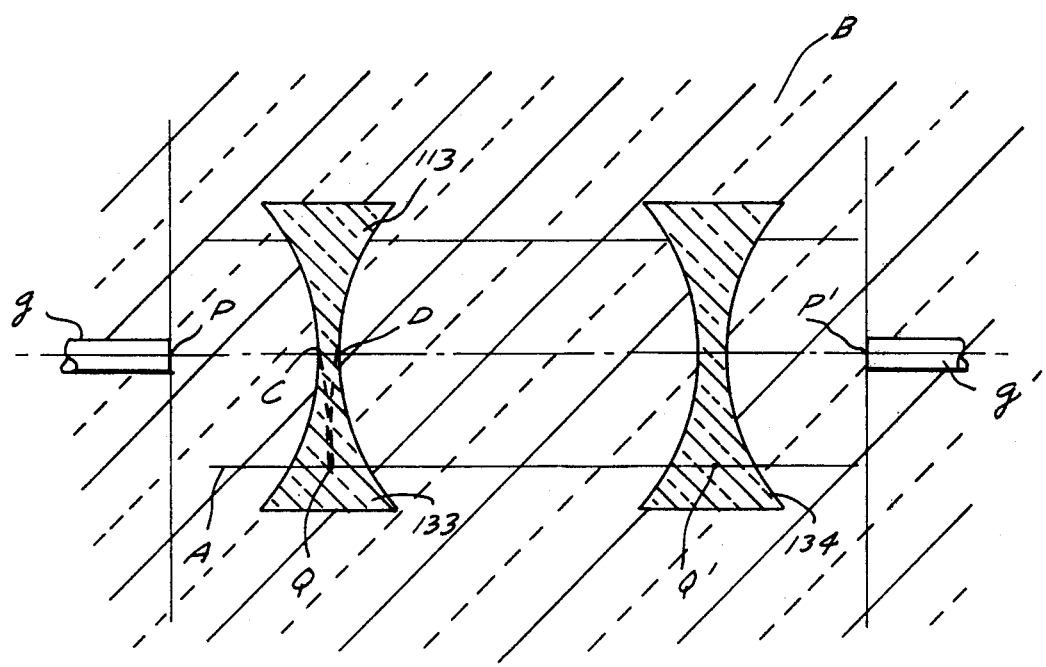
FIG. 8 is another diagrammatic view similar to FIG. 1, illustrating a further embodiment.

Bodies L and L' could also consist of a material, possibly air, having a lower refractive index than the surrounding medium, i.e., member B. In that instance the lens profiles of these bodies should be bounded by predominantly concave rather than convex faces, as illustrated in FIG. 8 described hereinafter, to establish the focal points F, F' and G, G' of FIG. 1. Naturally, this also applies to the lens bodies H and H' of FIG. 3 which can be similarly encased.

Reference will now be made to FIG. 5 which shows a system generally similar to that of FIG. 1, except that the refractive bodies of the equalizer there illustrated have truncated lens profiles 13, 33 and 14, 34 which do not include the corresponding optical axes. Here, the optical axis A of profiles 13 and 14, passing through points O and O', lies below the common profile boundary of each body coinciding with centerline 5, thus in a cut-away portion of profile 13 or 14 which has been indicated by dot-dash lines and includes phantom vertex points V and V'. At points C and D the curvature of the lens faces is again discontinuous, as in the system of FIGS. 1-4, yet the absence of a re-entrant surface portion in the vicinity of centerline 5 makes the bodies of FIG. 5 easier to manufacture. However, paraxial rays entering these bodies close to that centerline will continue in the same general direction so that the equalizer of FIG. 5 is not as efficient in its suppression of signal distortion.

The optical and geometrical relationships of parameters w, c, f and d have the same significance in FIG. 5 as in FIG. 1, yet in this instance the points P and P' emitting and collecting the rays passed by the equalizer lie on respective focal planes II and II' of the lens profiles so that the distance s of FIG. 1, separating the geometrical centers Q and Q' from the proximal guide ends, becomes equal to focal length f. Since a bundle of light rays originating within the plane of FIG. 5 at any point of focal plane P will be converted into parallel rays by the lens profile 13 or 33, a limiting ray r will be refracted at point R onto a path r' which is parallel to a straight line extending from point P to the optical center O of lens profile 13 (it being assumed, for simplicity, that this profile conforms to the law of thin lenses); thus, the image point P" of FIG. 1 is moved to infinity in the system of FIG. 5. The distance d between points Q and Q' is so chosen that ray r' passes through the geometrical center Q' of body 14, 34 while an axial ray z emerging from body 13, 33 on a path z' parallel to path r' is intercepted by lens profile 34 at its nadir point U' (symmetrical to zenith R') spaced from centerline 5 by the critical distance w. Because of the symmetry of the lens profiles, ray z' has an identically designated mirror image extending to point R'; actually, since paraxial rays remain close to the axis as noted above, the two limiting rays z' are produced by rays striking the lens profiles 13 and 33 at a small angle to centerline 5. Thanks to the reciprocity of the ray paths established by lens profiles 13, 33 and 14, 34, the rays z, z' are refracted along paths z" toward the center point P' of guide' g' whereas rays r, r' pass substantially axially, at r", into the latter guide; the lower ray path r' extends from the nadir U of lens profile 33 to center Q'.

If $\alpha$ designates the angle included with the guide axis 5 by the line P–O (and therefore also by rays r' and z'), the following relationships obtain:

$$c = f \tan\alpha \qquad (10)$$

$$w = d \tan\alpha \qquad (11)$$

$$w = f \tan\theta_M \qquad (12)$$

From these relationships we can again establish equation (6) discussed in connection with FIG. 1.

In FIG. 6 I have shown the system of FIG. 5 applied to filamentary guides g, g', with the equalizer consisting of circularly symmetrical lens bodies T and T' in the shape of pads having cusps C and D, in contrast to the toroidal bodies H and H' of FIG. 3. FIG. 7 again shows an adaptation of the system to flat guides g and g', with cylindrically curved lens bodies N and N'; as in FIG. 4, the lens bodies and the guides are united through a transparent member B having the same index of refractivity as the guides g and g'.

In FIG. 8, finally, the lens bodies 13, 33 and 14, 34 of FIG. 5 have been replaced by bodies 113, 133 and 114, 134 whose index of refractivity is lower than that of the surrounding medium (member B) and which are of biconcave cross-section, with a discontinuity at their waists C–D. Lens profile 113 has been extended in phantom lines to its optical axis A. As noted above, these lens profiles could be constituted by air-filled voids in member B having a refractive index of unity. The lens profiles of FIG. 8 could also be planoconcave or in the form of negative menisci. Thanks to their narrower waists, lens bodies of the type illustrated in FIG. 8 conform more nearly to thin lenses than do their convex counterparts shown in the preceding Figures so that fewer paraxial rays will pass substantially undeflected through them.

I claim:
1. In an optical signal-transmitting system, in combination:
two aligned light guides with confronting ends respectively emitting and collecting bundles of light rays whose limiting rays include a critical angle with a common centerline of said light guides in at least one longitudinal plane of symmetry thereof; and
an equalizer between said light guides comprising two identical transparent bodies of positive refractivity spaced apart from each other and from said confronting ends along said centerline, each of said bodies having a cross-section in said plane of symmetry consisting of two symmetrical truncated lens profiles with a boundary lying on said common centerline and with optical axes lying on opposite sides of said boundary, each of said lens profiles extending from said boundary to at least a point of interception of a limiting ray of a ray bundle converging at the closer light-guide end, the path of a limiting ray extending from said point of interception at a lens profile of one of said bodies to the geometrical center of the other of said bodies and thence substantially along said centerline to the more distant light-guide end; the distance w of said point of interception from said centerline, the spacing c of said optical axes from said boundary, the focal length f of each lens profile and the separation d of the geometrical centers of said bodies substantially satisfying the relationship $w/c = d/f$.

2. The combination defined in claim 1 wherein each truncated lens profile includes the optical axis thereof, the distance of said geometrical centers from said light guides exceeding said focal length f.

3. The combination defined in claim 1 wherein each truncated lens profile terminates short of the optical axis thereof, the distance of said geometrical centers from said light guides substantially equaling said focal length f.

4. The combination defined in claim 1 wherein said bodies are embedded in a transparent medium having substantially the same refractive index as said light guides, said medium extending at least to said confronting ends.

5. The combinaton defined in claim 4 wherein said bodies have a refractive index less than that of said medium and are provided with predominantly concave faces.

6. The combination defined in claim 1 wherein said light guides are fibers, said bodies being centrally symmetrical.

7. The combination defined in claim 1 wherein said light guides are flat, said bodies being cylindrical with generatrices parallel to the minor transverse dimension of said light guides.

* * * * *